Oct. 5, 1965 R. W. WOLFE 3,210,567
REVERSIBLE ELECTRONIC COUNTER
Filed April 5, 1962
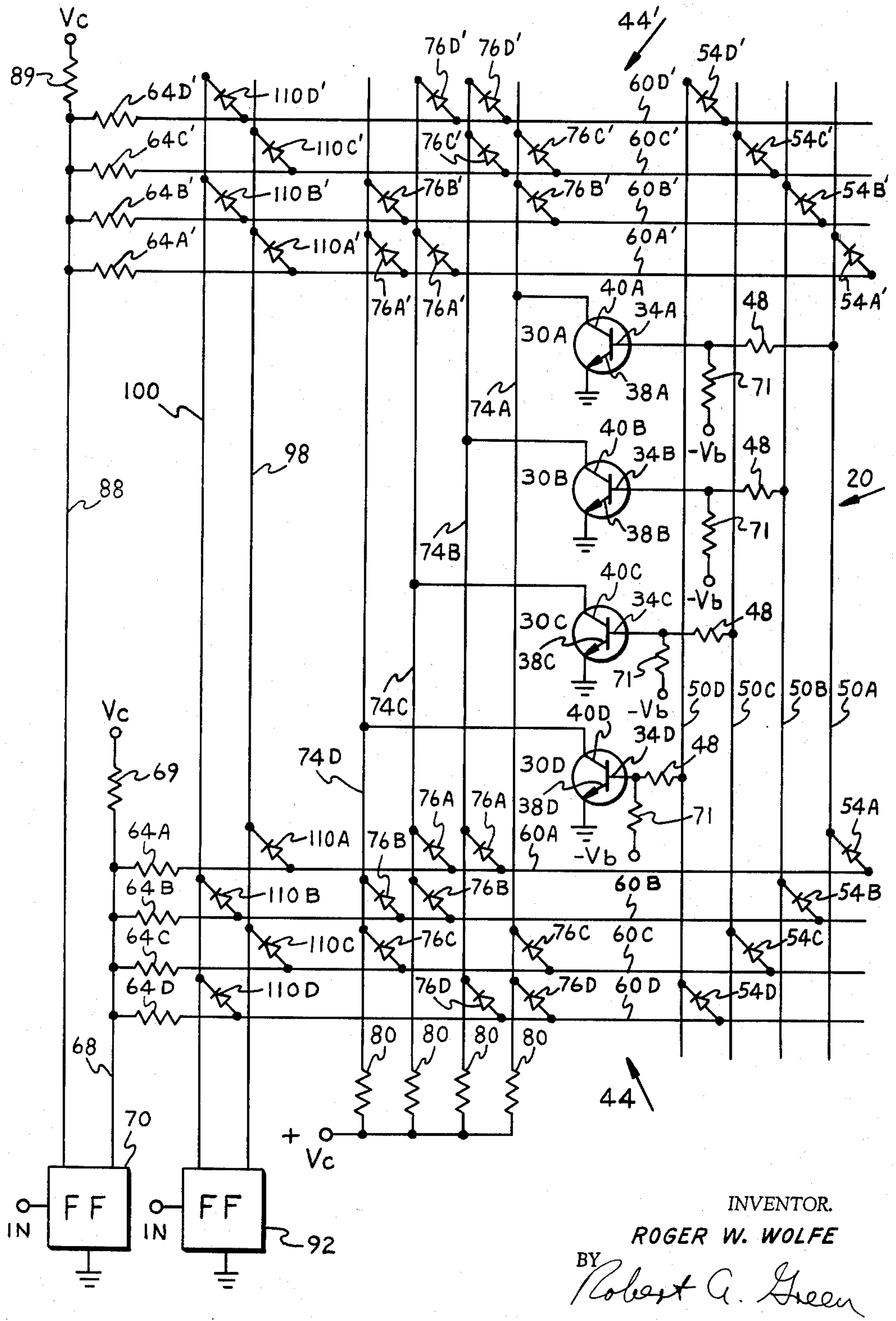
INVENTOR.
ROGER W. WOLFE
BY Robert G. Green
ATTORNEY 3,210,567

REVERSIBLE ELECTRONIC COUNTER

Roger W. Wolfe, South Plainfield, N.J., assignor to Burroughs Corporation, Detroit, Mich., a corporation of Michigan Filed Apr. 5, 1962, Ser. No. 185,463
6 Claims. (Cl. 307—88.5)

This invention relates to electronic counter circuits and particularly to semiconductor counter circuits which are reversible in operation.

One type of electronic semiconductor counter recently devised utilizes a diode matrix to feed counting signals to a plurality of transistors, or the like, one transistor being provided for each counting step to provide digital or decimal output logic. Such a circuit can be coupled directly to a decimal readout or indicator device to provide a direct visual indication of the counting operation. In this case, the readout device has one indicator element for each separate source of signal information. This type of circuit operates quite satisfactorily. However, the circuit is not reversible in operation and, under some circumstances, it is desirable to be able to reverse the operation of a counter.

The objects of the present invention concern the provision of a relatively simple and inexpensive semiconductor counter utilizing a diode matrix and operable to count in both forward and reverse directions.

Briefly, a counter circuit embodying the invention includes a plurality of count storing means, each of which comprises a separate step in a counting chain. First circuit means, including a source of pulses to be counted, is coupled to the storage or register means in such a way as to cause a counting operation to be executed in a predetermined direction from one register means to the next in order. A second circuit means, including a source of counting pulses, is similarly coupled to the register means to cause the counting operation to be executed in the reverse direction. In addition, the circuit includes master control means for determining whether the first or second circuit means controls the operation of the register means and thereby determines the direction in which the counting operation proceeds.

The invention is described in greater detail by reference to the drawing wherein the single figure is a schematic representation of a counter circuit embodying the invention.

Referring to the drawing, a counter circuit 20 embodying the invention includes a plurality of count registering means which comprise electron discharge devices, for example, semiconductor devices 30 such as transistors or the like. Each transistor operates in the nature of a switch and is adapted to execute or register one count, and the total number of transistors provided in the chain of counters is determined by the total number of counts to be executed by the counting circuit. For convenience, only four counting steps are shown including transistors 30A, 30B, 30C, and 30D. The discharge devices 30 are shown as three-element NPN transistors; however, it is clear that PNP or the like devices may be used to perform the same function. Each transistor includes base, emitter, and collector electrodes 34, 38, and 40, respectively.

According to the invention, the counter circuit 20 includes a first diode matrix 44 which is coupled to the transistors 38 to cause the counting operation to proceed in a first direction, which is assumed to be from transistor 30A to 30B to 30C and to 30D. To perform this counting operation, the input or base electrode of each transistor is coupled through a resistor 48 and lead 50 to the cathode of a diode 54, the anode of which is connected through a lead 60 and a resistor 64 to one of the outputs 68 of a master control flip-flop 70, which may be of conventional construction. Thus, the base 34A of transistor 30A is connected through lead 50A and diode 54A and through resistor 64A to the flip-flop. Similarly, transistor 30B is connected through lead 40B, diode 50B, and resistor 60B to the output of the flip-flop. The other transistors are similarly connected, all to the same output 68 of master flip-flop 70. The output lead 68 is also coupled through a resistor 69 to a positive D.C. power source $V_c$. Each base electrode is also coupled through a resistor 71 to a small negative D.C. power source $V_b$.

Each of the transistors 30 has its output or collector electrode 40 connected back through a diode 76 in the matrix 44 to the base electrode of each transistor except its own base electrode and that of the transistor adjacent to it in the counting cycle. Thus, the output of transistor 30A is connected though lead 74A to the cathode of a diode 76C, the anode of which is connected through the diode 54C to the base electrode of transistor 30C. Similarly, the output electrode of transistor 30A is coupled through diodes 76D and 54D to the base electrode of transistor 30D. Transistor 30B is similarly connected to the base electrodes of transistors 30A and 30D. The other transistors are similarly connected. Each collector electrode is also coupled through its lead 74A, 74B, 74C, and 74D and through a load resistor 80 to positive D.C. power source $V_c$.

A second diode matrix 44′, which is similar to the matrix 44, is connected in the circuit in the following manner. The collector of transistor 30A is coupled through lead 74A to the cathode of a diode 76B′, the anode of which is coupled through lead 60B′ to the anode of diode 54B′, the cathode of which is connected through lead 50B to the base of transistor 30B. The collector of transistor 30A is similarly coupled through diode 76C′, lead 60C′, diode 54C′, and lead 50C to the base electrode of transistor 30C. The collector of transistor 30B is similarly coupled through lead 74B, diode 76C′, diode 54C′, and lead 50C to the base of diode 30C. The collector of transistor 30B is also coupled through diodes 76D′ and 54D′ to the base of transistor 30D. The collector of transistor 30C is similarly coupled to the base electrodes of transistors 30A and 30D, and the collector of transistor 40D is similarly coupled to the base electrodes of transistors 30A and 30B. The leads 60A′, 60B′, 60C′, and 60D′ are coupled through resistors 64A′, to 64D′ and to the second output lead 88 of flip-flop 70. Output lead 88 is also coupled through resistor 89 to power source $V_c$.

A second driving flip-flop 92 is provided having two output leads 98 and 100 which are connected through diodes to alternate leads 60A to 60D and 60A′ to 60D′. Thus, output 98 is connected to the cathode of diode 110C, the anode of which is connected to line 60C. Output 98 is also connected through diode 110A to line 60A and through diode 110A′ and diode 110C′ to lines 60A′ and 60C′, respectively. Output 100 of flip-flop 92 is similarly connected through diodes 110B and 110D to lines 60B and 60D and through diodes 110B′ and 110D′ to lines 60B′ and 60D′, respectively.

In operation of the counter of the invention, assuming it is desired to count in order from transistor 30A to 30B to 30C to 30D, the flip-flop 70 is set so that output lead 68 is at a positive potential, and output lead 88 is at a generally negative or ground potential. Thus, diode matrix 44 is rendered operative and matrix 44′ is held inoperative. The flip-flop 92 is set so that output lead 98 is at a positive potential and correspondingly output 100 is at a generally negative or ground potential. With the circuit components thus set, the positive potential on lead 68 is coupled into diode matrix 44 through line 60A and diode 54A to the base electrode of transistor 30A which is turned on thereby. When transistor 30A is turned on, its collector 40A is reduced to about ground potential, and this ground potential is coupled through line 74A and diodes 76C and 76D to lines 60C and 60D which are also thus held at ground potential. In this way, the positive potential of flip-flop output 68 is prevented from turning on transistors 30C and 30D. Since the output lead 100 of flip-flop 92 is at a generally negative potential, this potential is coupled through diode 110B to line 60B which is thus at a generally negative potential and prevents the base of transistor 30B from being affected by the positive potential on lead 68 of flip-flop 70. Thus, only transistor 30A is on, and the others are held off.

When a counting pulse is applied to the input of flip-flop 92 and the potentials of leads 98 and 100 are reversed, line 98 assumes a generally negative potential and line 100 assumes a positive potential. Thus, the positive potential on the output 68 of flip-flop 70 is coupled through leads 60B and 50B to the input or base electrode of transistor 30B which is turned on thereby. When transistor 30B is turned on, its collector electrode is reduced to about ground potential, and this ground potential, coupled through lead 74B and diodes 76A and 76D, holds lines 60A and 60D at ground potential. Thus, transistors 30A and 30D are prevented from being turned on by flip-flop 70. The generally negative potential on output 98 of flip-flop 92 coupled through diode 110C to line 60C similarly prevents transistor 30C from being turned on. Thus, only transistor 30B is on. In the same way, each counting pulse applied to flip-flop 92 causes the count to be transferred from one transistor to the next in order.

To reverse the direction of counting of the transistors from transistor 30D to 30C to 30B to 30A, an input pulse is applied to flip-flop 70 to reverse the potentials on its output lead 68 and 88 so that lead 68 carries a generally negative potential and lead 88 carries a generally positive potential. In this way, diode matrix 44 is rendered inactive and diode matrix 44′ is rendered active. When it is desired to reverse the counting operation of the flip-flop, is is generally desired to count in a reverse direction from the last counting step in the previous direction of counting. Thus, assuming that transistor 30D is conducting, flip-flop lead 100 is at a positive potential and lead 98 is at a generally negative potential. Transistor 30A is held off by the negative potential on output 98 of the flip-flop 92 and transistors 30A and 30B are held off by the ground potential on the collector electrode of transistor 30D, as described above. The ground potential of transistor 30D operates through diode 76A′ and 76B′ to hold transistors 30A and 30B off.

The next counting pulse applied to flip-flop 92 reverses the potentials on leads 98 and 100, and a positive potential is now applied to diode 110C′, thus allowing the positive potential on lead 88 of flip-flop 70 to be coupled to the base electrode of transistor 30C. Transistor 30C is turned on thereby. Thus, the collector electrode of transistor 30C is reduced to ground potential and is coupled through diodes 76A′ and 76D′ to the base electrodes of transistors 30A and 30D which are thus held off. The negative potential on lead 100 of flip-flop 92 coupled through diode 110B′ holds off transistor 30B. In the same way, additional counting pulses applied to the flip-flop 92 cause the count to proceed from transistor 30C to 30B and then to 30A, and so forth along the counting chain.

When it is again desired to change the counting direction, the flip-flop 70 is reset and positive potential applied by lead 68 energizes diode matrix 44 and the negative potential on lead 88 inactivates diode matrix 44′.

It is clear that both PNP and NPN transistors and similar devices, including even vacuum tubes, might be used to perform the function described above for transistors 30A to 30D. It is also clear that the circuit might be arranged so that each counting device might be turned off and all other devices be held on by each counting pulse applied to the counting circuit. Other modifications within the scope of the invention will also be clear to those skilled in the art.

What is claimed is:

1. A counter circuit including
- a plurality of count registering means comprising steps in a counting chain,
- a first diode matrix coupled to said count registering means for controlling the application of counting pulses thereto and for causing the counting operation to proceed in a predetermined direction along the counting chain,
- a second diode matrix coupled to said count registering means for controlling the application of counting pulses thereto and for causing the counting operation to proceed in a predetermined direction along the counting chain,
- a flip-flop having two outputs each coupled to both of said diode matrices for applying counting pulses thereto,
- and master control means coupled to both said first and second diode matrices for rendering one or the other operative and thereby controlling the direction in which the counting operation proceeds.

2. The counter circuit defined in claim 1 wherein said master control means comprises a flip-flop having two output leads, one being coupled to one diode matrix and the other being coupled to the other diode matrix.

3. The circuit defined in claim 1 wherein each count registering means comprises an electron discharge device having input and output electrodes, the output of each device being coupled through both diode matrices to the input electrodes of selected ones of said devices.

4. The circuit defined in claim 1 wherein each count registering means comprises a semiconductor device having an input electrode and an output electrode.
- the output electrode of each device being coupled through the first diode matrix to the input electrode of every other device except its own and except the base electrode of the device adjacent to it in the counting order,
- the output electrode of each device also being coupled through the second diode matrix to the input electrode of every other device except its own and except the base electrode of the device adjacent to it in the reverse counting order.

5. A counter circuit including
- a plurality of transistors comprising separate steps in a counting chain and including input and output electrodes,
- a first diode matrix coupled to said transistors and interrelating the input and output electrodes thereof to cause them to execute a counting operation in one direction from one to the next,
- a second diode matrix coupled to said transistors and interrelating the input and output electrodes thereof to cause them to execute a counting operation in the opposite direction,
- a flip-flop driving means coupled through both of said diode matrices to the input electrodes of said transistors for causing said transistors to execute said counting operation,
- and a master flip-flop coupled to said first and second diode matrices for causing one or the other to control the operation of said transistors and to thereby determine the direction in which said transistors count.

6. A counter circuit including
- a plurality of transistors comprising separate steps in a counting chain and each including an input and output electrode,
- a first diode matrix coupled to said transistors for causing them to execute a counting operation in one direction from one to the next,
- the output electrode of each transistor being coupled through said first diode matrix to the input electrode of all other transistors except its own and that of the next adjacent transistor in said one counting direction, a second diode matrix coupled to said transistors for causing them to execute a counting operation in the opposite direction from one to the next, the output electrode of each transistor being coupled through said second diode matrix to the input electrode of all transistors except its own and that of the next adjacent transistor in said opposite counting direction, a flip-flop driving means coupled to both said diode matrices for causing said transistors to execute said counting operations, and a master flip-flop selector means coupled to said first and second diode matrices for causing one or the other to control the operation of said transistors and to thereby determine the direction in which said transistors count.

References Cited by the Examiner

UNITED STATES PATENTS

| | | | |
|---|---|---|---|
| 2,764,349 | 9/56 | Hogopian | 235—92 |
| 2,864,962 | 12/58 | Jensen | 307—88.5 |
| 2,977,539 | 3/61 | Townsend | 328—44 |
| 3,076,956 | 2/63 | Hogan et al. | 307—88.5 |

FOREIGN PATENTS

| | | |
|---|---|---|
| 857,232 | 12/60 | Great Britain. |

MALCOLM A. MORRISON, *Primary Examiner.*